Patented Nov. 5, 1946

UNITED STATES PATENT OFFICE 2,410,604

MANUFACTURE OF NEW COLORING MATTERS

Eric Paul Goodings and Maurice Arthur Thorold Rogers, Blackley, Manchester, England, assignors to Imperial Chemical Industries Limited, a corporation of Great Britain No Drawing. Application July 9, 1943, Serial No. 494,121. In Great Britain July 13, 1942

3 Claims. (Cl. 260—313)

This invention relates to the manufacture of new coloring matters.

According to the invention we provide a process for the manufacture of new coloring matters which comprises causing to interact a 5-nitroso-2:4-diarylpyrrole of the formula

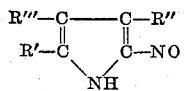

where R' and R" stand for aryl radicals for example of the benzene or naphthalene series, substituted or not, the same or different, and where R''' stands for hydrogen or for a non-reactive substituent, for example an aryl-, alkyl-, alkylamino-, benzylideneamino- or acylamino- radical, with a compound, other than a 2:4-diaryl-pyrrole, containing one or more reactive methylene groups.

The 5-nitroso-2:4-diarylpyrroles which are used as one of the starting materials in the process of the invention may be made by nitrosation of 2:4-diarylpyrroles as is described in British application No. 16,278/41 and U. S. application Serial No. 457,230, filed September 3, 1942, now U. S. Patent 2,382,916. Suitable 5-nitroso-2:4-diarylpyrroles which may be used include 5-nitroso-2:4-diphenylpyrrole, 5-nitroso-2-phenyl-4-(p - methoxyphenyl) - pyrrole, 5-nitroso-2-(p-methoxyphenyl) - 4 - phenylpyrrole, 5-nitroso-2-(m-hydroxyphenyl) -4-phenylpyrrole, 5 - nitroso-2-(o-chlorophenyl) -4-phenylpyrrole, 5-nitroso-2-(p-acetylaminophenyl) - 4 - phenylpyrrole, 5-nitroso-2-α-naphthyl-4-phenylpyrrole, 5-nitroso-2-phenyl-4-β-naphthyl-pyrrole, 5 - nitroso - 2:3:4-triphenylpyrrole, 5-nitroso-3-benzoylamino-2:4-diphenylpyrrole, 5-nitroso-3-acetylamino-2:4-diphenylpyrrole, 5-nitroso-3-benzoylamino-2:4-di-p-tolylpyrrole and 5-nitroso-3-acetoacetylamino-2:4-diphenylpyrrole. Also included are the sulphonic acids of the 5-nitroso-2:4-diarylpyrroles listed above. These may be made, for example, by nitrosating the corresponding sulphonic acid derivatives of the 2:4-diarylpyrroles. The latter sulphonic acid derivatives can be made by the process described in Rogers application Serial No. 482,479, filed April 9, 1943.

Suitable compounds containing a reactive methylene group include indoxyl, thioindoxyl, 2-alkylindoles, N-methyl-oxindole, α:γ-diketohydrindene, 2-quinaldine methiodide, 1-methyl-benzoxazole methiodide, 1-methyl-benzthiazole methiodide, 1:3:3 - trimethyl-2-methylene-dihydroindole ("Fischers' base"), 1-phenyl-3-methyl-5-pyrazolone, cyanacetic ester, chloroacetonitrile, phenylsulphonyl-acetonitrile, 2:4-dinitrotoluene, N-phenylrhodamine, barbituric acids, sulphazones, 2:4 - dihydroxyquinolines, dihydroresorcinol, benzyl cyanide, cyanoacetophenone, desoxybenzoin, α-naphthol, 2-keto-2:3-dihydrobenzthiazine and 3:3'-dinitro-4:4'-dimethylstilbene.

The formation of the new coloring matters may be represented, in equation form, as follows:

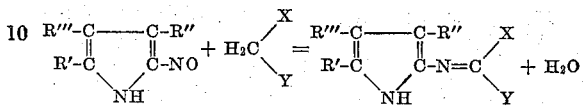

where R', R" and R''' have the significance given above and where

is a compound, other than a 2:4-diarylpyrrole, containing a reactive methylene group. If compounds containing more than one reactive methylene are used, then, as will be understood, more than one molecular proportion of the nitroso-compound will react therewith.

In carrying the process of the invention into effect, the ingredients are brought into reaction by methods known to be effective in bringing about condensations with the particular compound containing a reactive methylene group which is being used. Mixing or heating together in a mutual solvent is frequently sufficient. A preferred method, in many cases, is to heat the reagents together in a mutual solvent, for example ethanol, in the presence of a base, for example piperidine, which increases the speed of the condensation. The products may be isolated and purified by conventional methods.

The new coloring matters are varied in color and may be used as pigments or for other coloring purposes. In the form of water-soluble derivatives, for example salts, sulphonic acids, or salts of these, the new coloring matters may be used for dyeing.

Water-soluble derivatives may be obtained by forming salts of those of the coloring matters, which are sufficiently basic, for example, with sulphamic acid, by forming quaternary ammonium salts (when quaternary salt-forming groups are present), or by sulphonation of the coloring matters to yield sulphonic acid derivatives which are in themselves, or in the form of their salts, soluble in water. Alternatively, water-soluble derivatives may be obtained by using as one or both of the ingredients a compound containing already one or more water-solubilising groups, for example, sulphonic acid groups.

The invention is illustrated but not limited by the following examples, in which parts are by weight:

Example 1

2.54 parts of 1-phenyl-3-methyl-5-pyrazolone monosulphonic acid, 2.48 parts of 5-nitroso-2:4-diphenylpyrrole, 1.03 parts of piperidine and 50 parts of ethanol are mixed, stirred and heated under reflux during 1½ hours. The mixture is then allowed to cool and a crystalline precipitate which is formed is filtered off, washed with methanol and dried. This consists of the piperidine salt which may be converted into the sodium salt as follows:

1.72 parts of the piperidine salt are dissolved in 400 parts of boiling water and the solution is made alkaline to Brilliant Yellow by addition of 0.4 part of caustic soda. A gel is thus obtained which is coagulated by addition of 10 parts of sodium chloride and the precipitated solid is filtered off and dried. The product is a dark greenish-brown powder which dyes wool or silk from a neutral or acid bath a bright brown-violet shade of very good wet-fastness properties.

Example 2

18.5 parts of finely powdered 5-nitroso-2:4-diphenylpyrrole hydrochloride and 16 parts of dry benzene are stirred together to give a paste and to the stirred paste 13.6 parts of 1:3:3-trimethyl-2-methylene-dihydroindole are added. The mixture is then heated to 60° C. and maintained at this temperature during 45 minutes. There is thus obtained a homogeneous mixture to which is added 200 parts of benzene. The mixture is then allowed to cool to atmospheric temperature and there is formed a crystalline precipitate which is filtered off and dissolved in 50 parts of ethanol. The solution is added slowly to 200 parts of 1% aqueous hydrochloric acid which is stirred and heated to 80° C. The hard cake which separates is filtered off, washed with water and dried. There is obtained 23 parts of the chlorine which is a greenish-bronze in color and is sparingly soluble in water.

A water-soluble dyestuff is obtained by converting this product to the sulphamate as follows. 3 parts of the product are dissolved in 30 parts of ethanol and the solution is poured slowly into a boiling solution of 6 parts of sulphamic acid in 300 parts of water. The mixture is then allowed to cool and the sulphamate separates in a crystalline form. The crystals are filtered and dried. They may be purified, if desired, by recrystallisation from ethanol.

Alternatively 4.39 parts of the chloride are dissolved in 100 parts of ethanol and 0.45 part of solid caustic soda dissolved in 5 parts of water are added. The anhydro-base separates from the solution as a crystalline precipitate. This is filtered, washed free from inorganic material with water and converted into the sulphamate by suspending in 100 parts of boiling ethanol and adding 0.97 part of sulphamic acid. On cooling the sulphamate separates as prisms with a greenish-coppery lustre.

The sulphamate obtained by either of these methods dissolves in water forming solutions which dye tannin-mordanted cotton in bright blue shades.

We claim:

1. The process which comprises causing to interact 5-nitroso-2:4-diphenylpyrrole with 1-phenyl-3-methyl-5-pyrazolone in a solvent medium in the presence of piperidine.

2. An asymmetrical chemical compound which contains a single 2:4-diaryl-pyrrole nucleus and has the general formula:

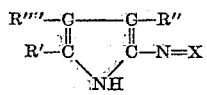

where R' and R'' stand for aryl radicals, R''' is a member of the group consisting of hydrogen, aryl-, alkyl-, and acylamino- radicals and where X is the residue of a reactive methylene compound which remains after splitting off the two reactive hydrogen atoms.

3. A process for the manufacture of chemical compounds which comprises interacting two compounds only one of which contains a 2:4-diaryl-pyrrole nucleus and has the general formula:

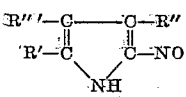

where R' and R'' stand for aryl radicals, R''' is a member of the group consisting of hydrogen, aryl-, alkyl-, and acylamino- radicals and the other is a reactive methylene compound containing at least one reactive methylene group and recovering an asymmetrical compound containing a single 2:4-diaryl-pyrrole nucleus and having the general formula:

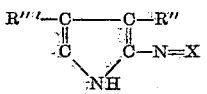

where R', R'', and R''' have the above significance and where X is the residue of a reactive methylene compound which remains after splitting off the two reactive hydrogen atoms.

ERIC PAUL GOODINGS.
MAURICE ARTHUR THOROLD ROGERS.